Aug. 27, 1940.  L. KLEIN  2,212,779
PULLEY
Filed May 15, 1937
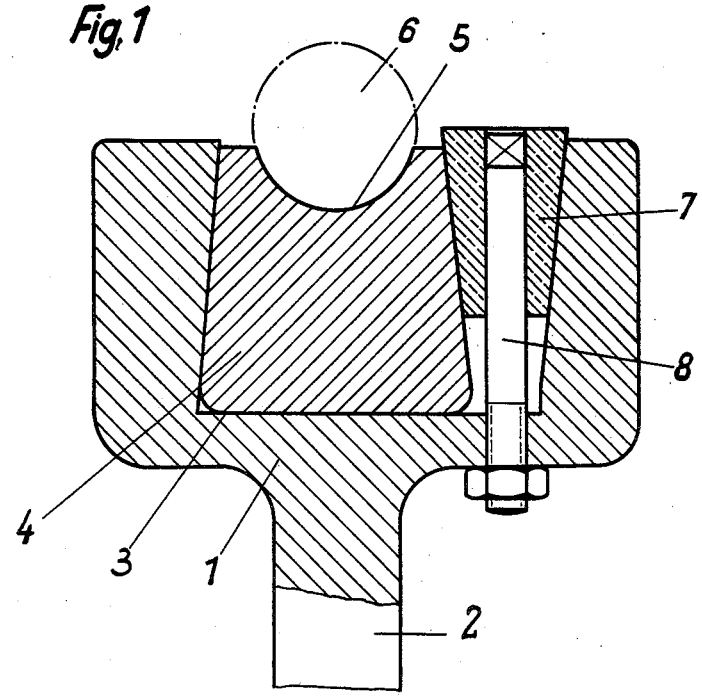
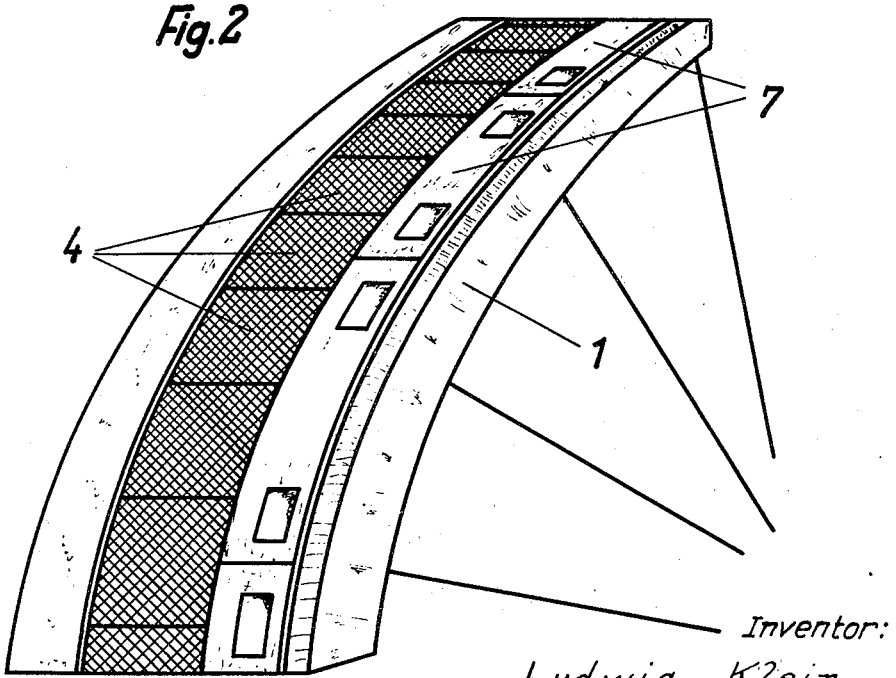
Inventor:
Ludwig Klein
By Young Emery & Thompson
Attorneys Patented Aug. 27, 1940

2,212,779

UNITED STATES PATENT OFFICE 2,212,779

PULLEY

Ludwig Klein, Hanover, Germany

Application May 15, 1937, Serial No. 142,920
In Germany May 23, 1936

4 Claims. (Cl. 74—230.5)

The invention is concerned with pulleys intended, more particularly, for use with wire ropes or cables, as for example in mines and rope railways, and for elevators, hoists, conveyors and the like. The pulleys may be driving or driven pulleys.

It is a common practice to provide the rims of such pulleys with a cover or insert for the purpose of increasing the friction and reducing slip. Inserts of wood, leather, cotton, artificial compositions and various other materials have been used.

According to my invention an insert or cover of aluminium or an aluminium alloy is used, or the rim itself is made of aluminium or an aluminium alloy. Generally or in most cases it is preferable to make the insert or cover in sections, a series of segments or curved plates being used.

Where an alloy of aluminium is used, it is preferred so to select and proportion the constituents that the Brinell hardness is below 80.

An embodiment of the invention is shown in the accompanying drawing,

Fig. 1 being a cross section of the rim, and

Fig. 2 being a perspective view of a segment of the rim.

In the drawing 1 designates the main portion or body of the rim, carried by the web or arms 2. The part 1 has a channel 3, in which are blocks 4 of aluminium or aluminium alloy, lying closely together so as to form a continuous insert. These blocks 4 have channels 5 for engaging the rope 6. The channel 3 is under-cut on one side (the left side in Fig. 1), and on the other side wedges 7 are inserted to retain the blocks 4, the wedges being held by bolts 8.

It will be understood that means other than the wedges may be used for fixing the blocks.

What I claim as my invention and desire to secure by Letters Patent of the United States is:

1. A driving and driven pulley for wire ropes or cables, comprising a rim having a circumferential channel therein, a plurality of blocks of aluminum arranged in the channel of the rim and constituting a lining, and a plurality of wedges inserted between the blocks and one side of the channel to retain the blocks in the channel, the rope contacting with the blocks.

2. A driving and driven pulley for wire ropes or cables, comprising a rim having a circumferential channel therein, a plurality of blocks of an aluminum alloy arranged in the channel of the rim and constituting a lining, and a plurality of wedges inserted between the blocks and one side of the channel to retain the blocks in the channel, the rope contacting with the blocks.

3. A driving and driven pulley for wire ropes or cables, comprising a rim having a circumferential channel therein, a plurality of blocks of aluminum arranged in the channel of the rim and constituting a lining, and a plurality of wedges in the channel to retain the blocks therein, the rope contacting with the blocks.

4. A driving and driven pulley for wire ropes or cables, comprising a rim having a circumferential channel therein, a plurality of blocks of an aluminum alloy arranged in the channel of the rim and constituting a lining, and a plurality of wedges in the channel to retain the blocks therein, the rope contacting with the blocks.

LUDWIG KLEIN.